United States Patent Office 3,313,350
Patented Apr. 11, 1967

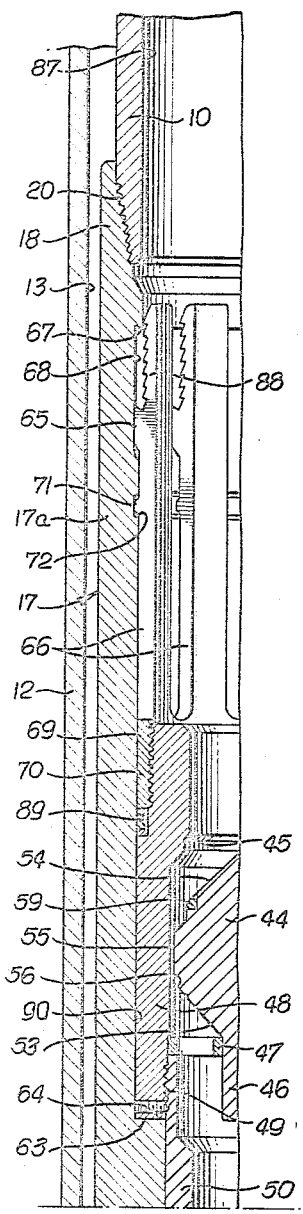
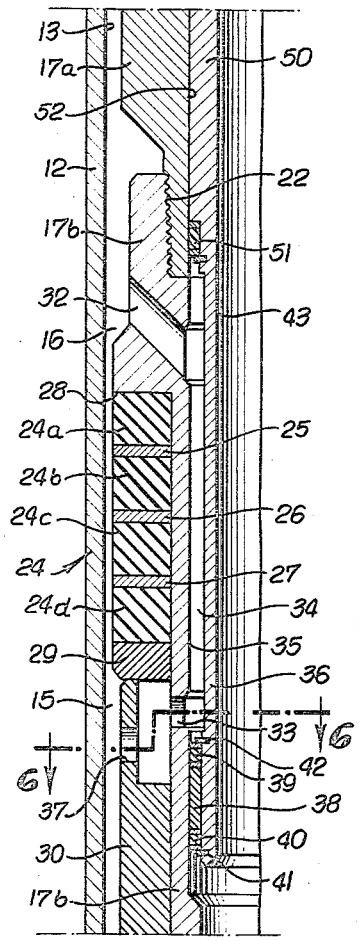
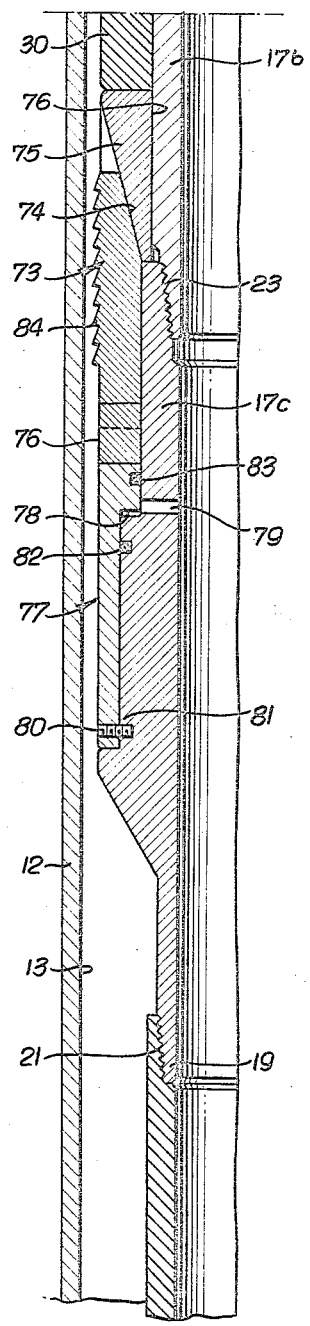

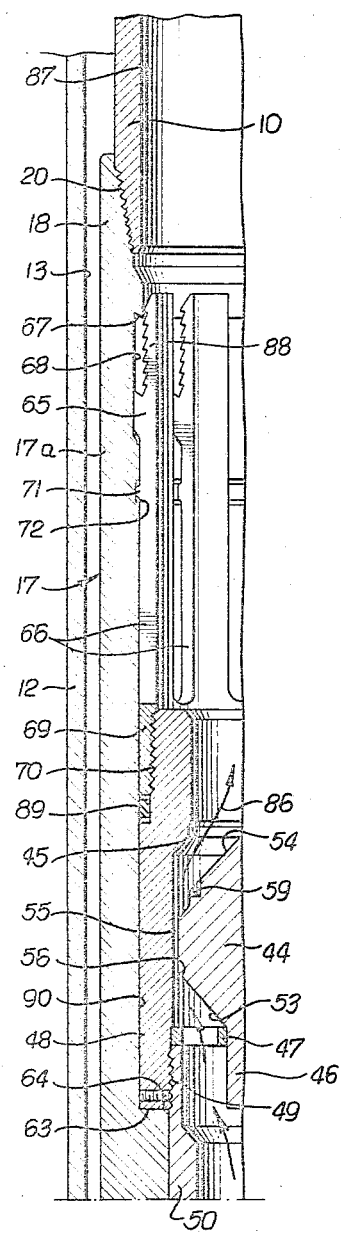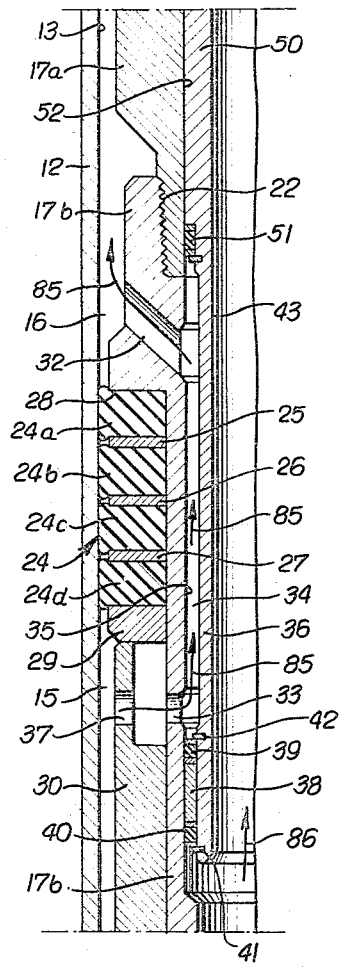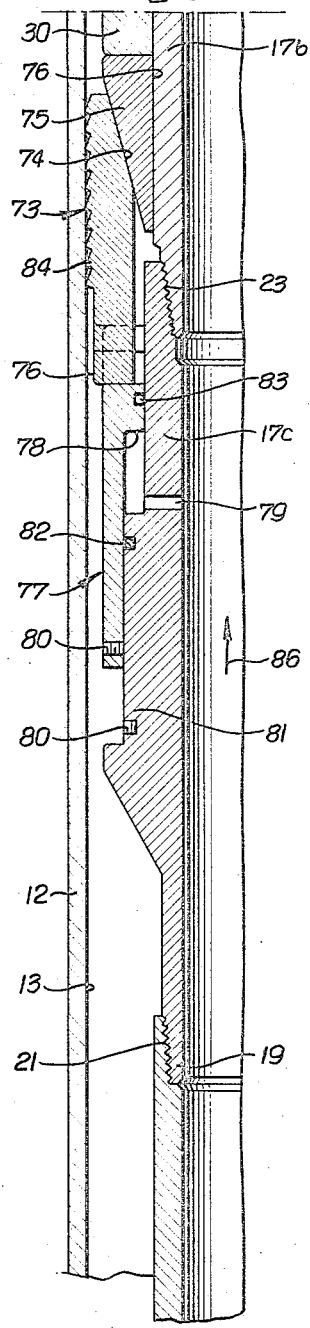

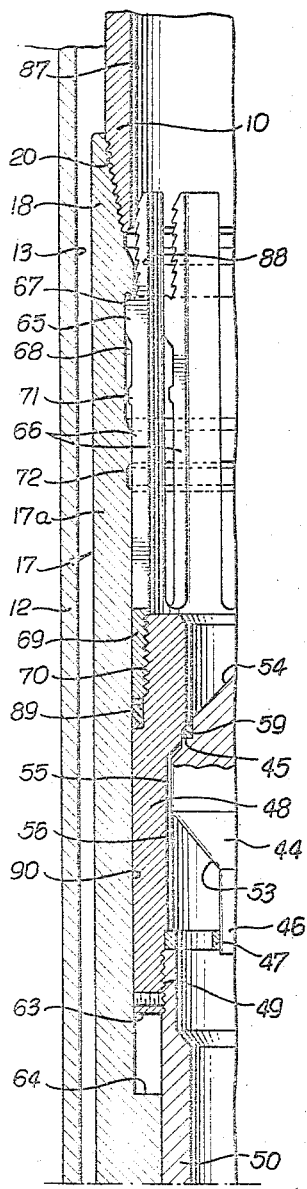

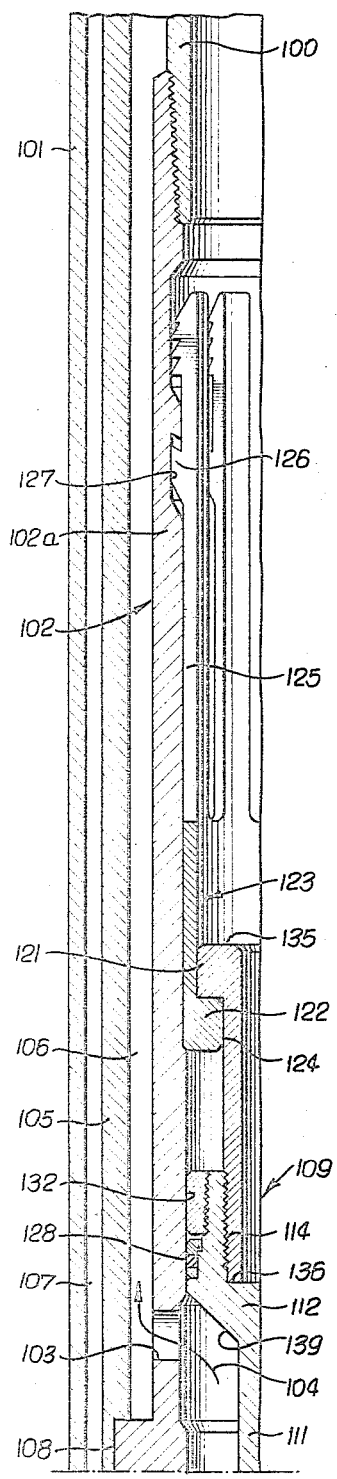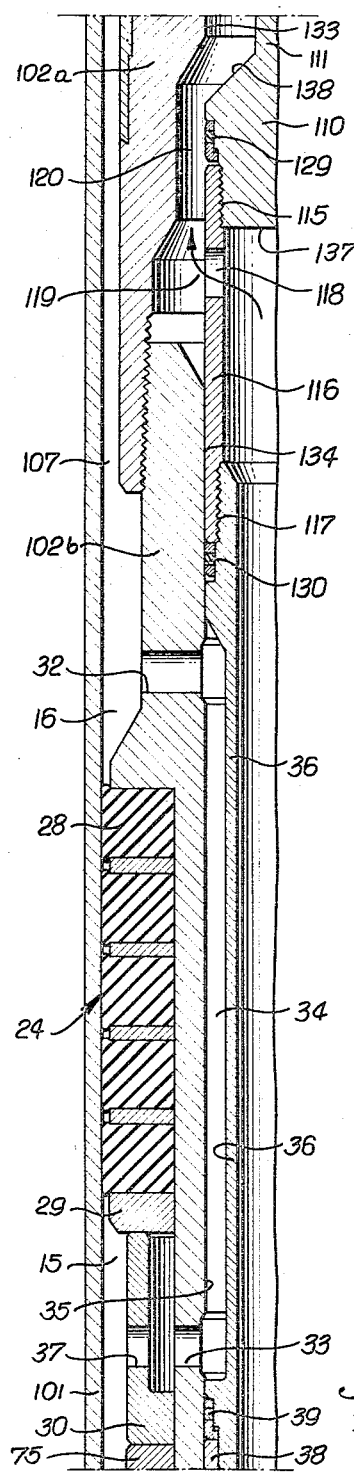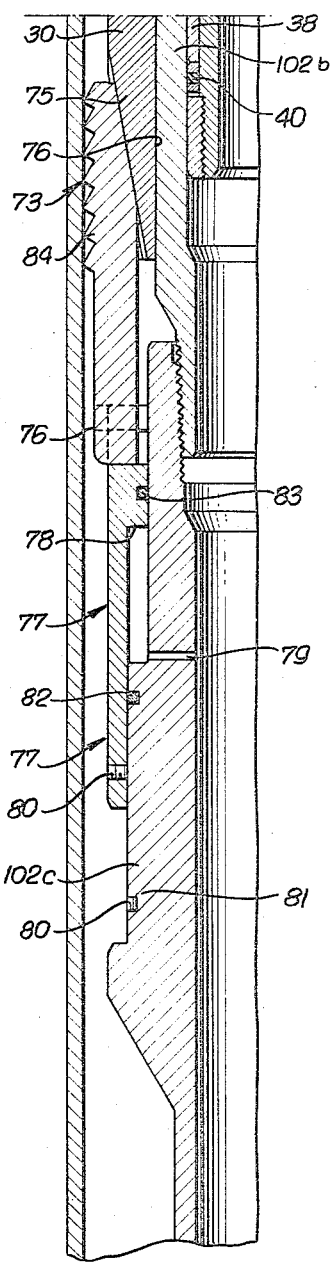

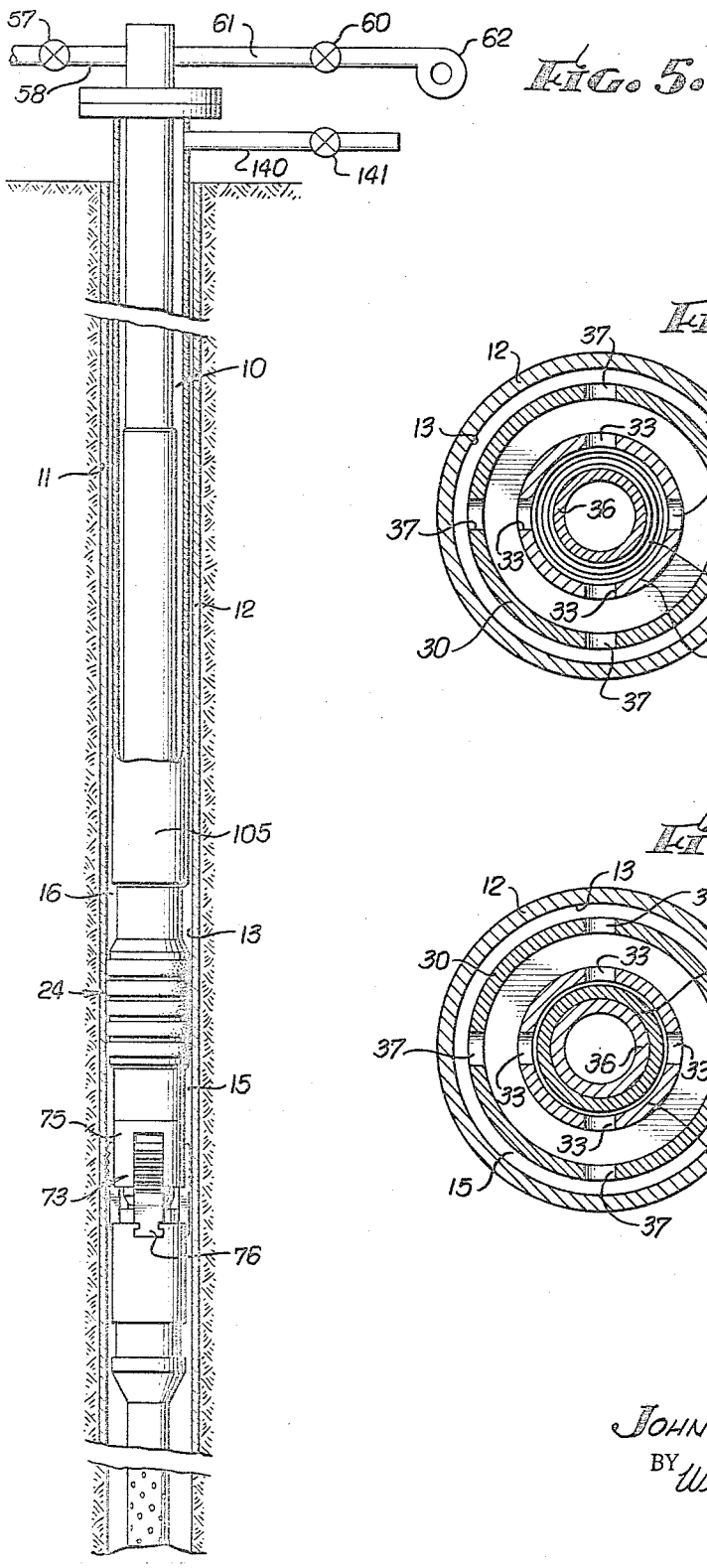

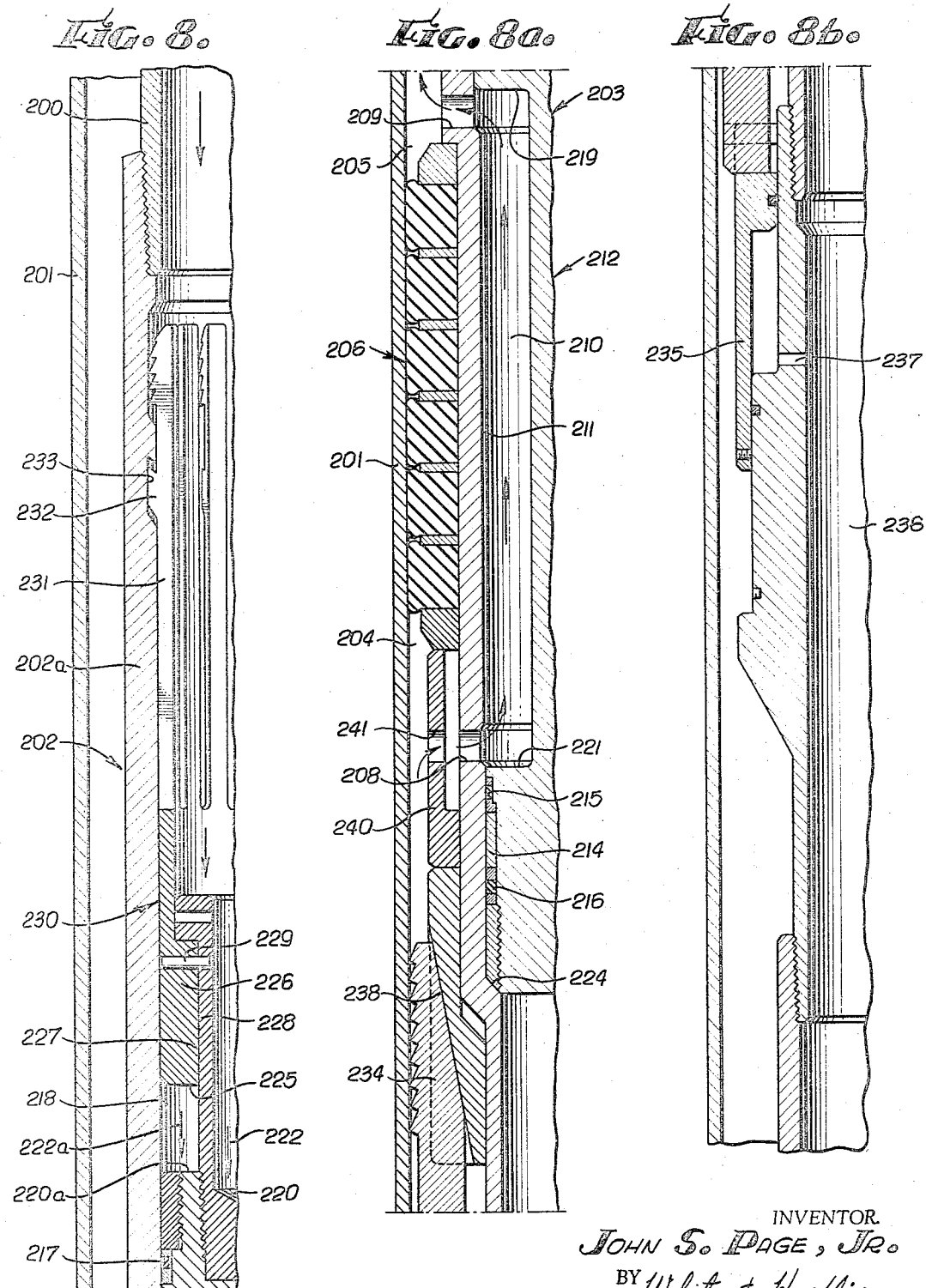

3,313,350
TUBING AND ANNULUS FLOW CONTROL
APPARATUS
John S. Page, Jr., 1450 El Mirador,
Long Beach, Calif. 90815
Filed May 14, 1964, Ser. No. 367,359
30 Claims. (Cl. 166—46)

This invention relates generally to the control of fluid flow in a well, and more particularly concerns the utilization of fluid pressure transmitted within a string of tubing to control the flow of production fluid streams both outside and inside the tubing.

In the completion, production and treating of oil and gas wells it becomes desirable at certain times to control intercommunication between the upper and lower zones in the well outside the tubing and separated by a packer; however, when the packer has been set in position to seal off between the tubing and the well base, the control of such intercommunication becomes a problem. One way of establishing intercommunication is to unset the packer by manipulation of the tubing supporting the packer, but this in turns presents the additional problem of removal of the well head with consequent expenditures of considerable time and effort. Another method of establishing such intercommunication is to lower a wire line tool into proximity to a valve operable in the well to control the desired fluid flow; however, wire line manipulation imposes additional difficulties including the considerable time and expense of running the line into and out of the well.

One object of the invention is to overcome the above difficulties to the end that intercommunication between packer separate upper and lower zones in a well and outside the tubing may be quickly established or controlled without well tubing or wire line manipulation and without unsetting of the packer.

Another purpose of the invention is to provide method and apparatus to simultaneously control the flow of a first production stream of fluid outside the string and a second production stream inside the string, all in response to a controlled change in fluid pressure transmitted by fluid in the string.

In its broader apparatus aspects the invention contemplates the combination comprising a tubing string in the well, apparatus packing off between the string and a bore in the well, and means for altering communication between well zones at lower and upper sides of the packer and outisde the string in response to a change in pressure transmission by fluid within the string. Typically, a vertically movable structure including a first valve member is provided to alter the upward flow of the first stream of production fluid between well zones at lower and upper sides of the packer and outside the string, and a second valve member is provided to control the flow of the second stream of production fluid in the string, the valving members being responsive to a change in pressure transmitted thereto by fluid acting in the string. In one form of the invention the valving is such that pressure transmitted upwardly by the second stream of production fluid is controllable to operate the valving. In a second form of the invention, the valving is operable in response to pressure transmitted downwardly by fluid in the string and out of communication with the streams of production fluid at the valving.

The invention also concerns a novel assembly connectable in series with a string of tubing in a well containing a packer, the assembly including a tubular sub body containing the above mentioned valving, which is upwardly removable or retrievable from the body and through the string. In the second form of the invention mentioned above, the body has a side port to pass the second stream of production fluid to the exterior, and the vertically movable structure remains in plugging relation with the string generally above the side port whereby control of first and second valve movement may be effected from the surface by controlling the downward pressure exerted by a column of fluid in the string and above the plug. In the first form of the invention referred to, the vertically movable structure plugs the body in one position and unplugs the body in another position, thereby to block and unblock the second stream of production fluid flow upwardly within the string, whereby the control of first and second valve movement may be effected from the surface by controlling the pressure exerted by the second stream of production fluid.

The broader concept of the method contemplated by the invention involves the control of production fluid flow in a well into which a string of production tubing is run, the annulus between the string and a well bore being packed off. Basically, the steps include flowing production fluid between well zones at upper and lower sides of the packer and outside the string, and effecting a change in such flow by changing the pressure transmitted by fluid within the string. More specifically, the production fluid may be caused to flow in a first stream and between well zones at upper and lower sides of the packer and outside the string, and a second stream of production fluid may becaused to flow vertically within the string, the method of flow control involving simultaneously changing flow of both streams by changing the pressure transmitted by fluid within the string. Typically, the pressure changing step is carried out by altering the pressure transmitted downwardly in the string by fluid out of communication with a second string; alternatively, the pressure changing step is carried out by changing the upward flow rate of the second stream of fluid. Additional steps may include preliminarily running into the well the tubing string supporting slip, packer and valve assemblies, operating the slip and packer assemblies to anchor the string to the well casing and to pack off between the string and casing, and then operating the valve assembly to alter the flow of the first and second streams of production fluid as described.

These and other objects and advantages of the invention, as well as the details of an illustrative embodiment, will be more fully understood from the following detailed description of the drawings, in which:

FIGS. 1, 1a and 1b are vertical half sections showing one form of apparatus being run into a well on a string of tubing, the apparatus being capable of packing off between the string and a bore in the well and also capable of altering well production fluid flow in the manner described and to be described;

FIGS. 2, 2a and 2b are vertical half sections showing the FIG. 1 apparatus set in a well with the valving or valve members in open position to pass first and second streams of production fluid;

FIGS. 3, 3a and 3b are vertical half sections showing the FIG. 1 apparatus set in a well with the valving or valve members in closed position to restrict or block upward flow of the first and second streams of production fluid;

FIGS. 4, 4a and 4b are vertical half sections showing another form of apparatus for controlling upward flow of first and second streams of production fluid, the control being effected by altering the pressure transmitted downwardly in the string by control fluid out of communication with the first and second streams of production fluid;

FIG. 5 is a vertical section showing the manner in which the apparatus may be connected in combination with a string of well tubing and controlled from the well surface;

FIG. 6 is an enlarged horizontal section taken on line 6—6 of FIG. 1a;

FIG. 7 is an enlarged horizontal section taken on line 7—7 of FIG. 3a; and

FIGS. 8, 8a and 8b are vertical sections showing yet another form of apparatus to control production fluid flow.

Referring first to FIG. 5, the combination shown includes a tubing string 10 in a well 11 which is cased at 12. Apparatus packing off between the string and a bore in the well, such as the bore 13 of the casing, may take the form of a packer generally indicated at 24. In accordance with the invention, means is provided for altering communication between well zones at lower and upper sides of the packer apparatus and outside the string in response to a change in pressure transmission by fluid within the string.

Extending the description to FIGS. 1–3, a portion of the above mentioned means may be considered to be included within an assembly connectible in series with a string of tubing in the well, the assembly including a tubular body 17 in the form of a sub having box and pin ends 18 and 19 respectively thread connected at 20 and 21 in the tubing string. The tubular sub body 17 includes sections 17a, 17b and 17c which are interconnected in vertical sequence at threaded joints 22 and 23.

The tubular body carries what may be referred to as packer apparatus generally indicated at 24 in FIG. 1a, the packer including endwise compressible ring sections 24a, 24b, 24c and 24d separated by metal rings 25, 26 and 27. These elements are in turn mounted on the body section 17b between an upper shoulder 28 and a lower compression ring 29 which is also mounted on the section 17b. It will be understood that the packer elastomer sections 24a–24d may be subjected to expansion into sealing engagement with the casing bore 13 in response to upward displacement of the ring 29 relative to the shoulder 28. In this regard, the actuator ring 29 may be urged upwardly by an actuator sleeve 30 slidably mounted upon the body section 17b. Reference to FIGS. 2a and 3a will show the packer 24 expanded as described, and sealing off the lower and upper annular zones 15 and 16 between the casing bore 13 and the tubular body 17.

The body 17 has upper and lower side porting indicated at 32 and 33 to by-pass a first stream of production fluid between lower and upper annular zones 15 and 16, around the packer, and via the body interior as for example the annular passage 34. The latter is formed between the bore 35 of the body section 17b and the periphery of a first valve member 36 in the form of a sleeve received within the body.

The sleeve valve may be characterized as carried by the body for movement between a first position in which communication between zones 15 and 16 is closed, and a second position in which said communication is open. Thus, as seen in FIG. 1a the side porting 33 is open, a suitable port 37 in the actuator sleeve 30 communicating between the zone 15 and the lower port 33 in the body section 17b. On the other hand, in FIG. 3a the lower side port 33 is closed, the valving being in its upper position. As there appears, the valving includes a cylindrical closure 38 and endwise spaced annular seals 39 and 40, all retained between the retainer rings 41 and 42 so as to be movable endwise with the valve. The seals engage the bore 35 of the body section 17b as the valve moves endwise, whereby the cylindrical closure 38 blocks or closes the lower port 33 which is sealed off from the interior passage 34 as seen in FIG. 3a.

It will also be noted that the valving member 36 contains an opening generally indicated at 43 to pass a second stream of well production fluid endwise therethrough. The second stream of production fluid is thereby enabled to pass upwardly independently of the first stream and toward an upper or second valve member operable to control the flow of the second stream of production fluid in the body. One such second valve is shown in FIGS. 1, 2 and 3 in the form of a plug 44 carried for bodily movement between a down position, as illustrated in FIG. 1, in which the plug is spaced below an annular seat 45 and an up position seen in FIG. 3, in which the plug engages the seat to prevent or block upward flow therethrough. The plug 44 is guided for vertical movement by a carrier stem 46 projecting downwardly through support or guide structure 47 extending transversely across the lower interior of a tubular part 48. The latter has threaded connection at 49 with another tubular part 50 which is integral with the lower valve sleeve 36, there being a seal 51 to seal off between the part 50 and the bore 52 of the body section 17a, as illustrated in FIG. 1a.

The valve plug 44 has lower and upper surfaces 53 and 54 which taper and are adapted to receive pressure transmitted by the upwardly flowing well production fluid second stream, there being an annular space 55 between the outermost periphery of the plug and the enlarged bore 56 of the part 48 to pass such upward flow when the valve is in down position. The space 55 may be sized to effect a pressure reduction of the flow, within a predetermined flow rate range, in order that a sufficient net pressure differential may be created as applied to the plug surfaces in order to effect sudden upward displacement of the plug to closed position. In this regard, the surface valve 57 in a line 58 communicating with the upper interior of the tubing string may be increasingly opened to cause the flow rate of the second stream of production fluid to increase for effective closing of the upper valve plug, as described. FIG. 1 shows a non-metallic ring 59 on the plug to engage with the seat 45 and thereby sealably seat the plug.

When the plug is thereby lifted, it will be seen that continued upward pressure exertion by second string fluid will be transmitted as an upwardly directed force tending to lift the mandrel parts 48 and 50 within the sub body 17, thereby to elevate the sleeve 36 of the lower valve member to close the side port 33 for blocking upward flow of the first stream of production fluid, as described above. Accordingly, the result is that by effecting control of fluid pressure within the string and from the surface the upward flow of the first and second streams of production fluid may be altered, and in this case arrested. Should it be desired to resume production, the valve 57 at the surface may be closed, and another valve 60 opened in a line 61 communicating between a pump 62 and the upper interior of the string 10. The pump 62 may then be operated to create sufficient pressure in the upper interior of the string to open the plug 44 as by displacing it downwardly to the position seen in FIG. 1, the plug driving the mandrel parts 48 and 50 downwardly, to open the lower valve member, allowing upward by-passing of production fluid in the first mentioned stream and around the packer 24. The pump 62 may then be stopped and the valve 60 closed, and thereafter the valve 57 opened to resume upward production of the second stream of fluid through the string.

Referring back to FIGS. 1 and 2, downward movement of the mandrel parts 48 and 50 within the sub body 17 is limited by engagement of the lower terminal 63 on part 48 with the upward facing shoulder 64 of the body section 17a. Upward travel of the mandrel parts is limited by engagement of the latches 65 on the spring fingers 66 with the downward facing shoulder 67 of the grooving 68 formed in the body section 17a. The spring fingers 66 urge the latches 65 outwardly into the grooving, and are carried by a collet ring 69 having thread connection at 70 to the mandrel part 48. Small detents 71 on the fingers 66 are receivable within shallow grooving 72 in the body portion section 17a when the lower valve member is open, as seen in FIGS. 1 and 1a, in order to prevent inadvertant closing of the lower valve member before desired change of fluid pressure within the string is effected, for closing the upper and lower valves.

Turning to FIGS. 1b, 2b and 3b, means is provided to effect outward spreading of lower slips 73 upon expansion of the packer 24. The slips 73 are typically formed to have wedge surface engagement at 74 with a cone member 75; however, the latter is vertically slidable at the interface 76 and on the sub body section 17b in order to transmit upward thrust to the actuator sleeve 30 operable to compress the packer 24 as described above. The slips 73 have T-slot interconnection at 76 with the lower actuator 77, the latter having a piston face 78 to which fluid pressure is transmitted from within the string and via the duct 79 in the sub body section 17c. When sufficient pressure is thus communicated to the piston face 78, the actuator 77 travels upwardly after shearing the pin 80 interconnecting the actuator and the flange 81 on the sub body section 17c. The actuator has sealing and sliding engagement with the periphery of the section 17c at the locations 82 and 83. Upward travel of the slips 73 effects their outward spreading on the cone member and also compression of the packer by force transmission to the cone member and the actuator sleeve 30. As a result, the slip wickers or serrations 84 firmly grip and anchor against the casing bore, as seen in FIGS. 2b and 3b. Release of the lower slips, when upward withdrawal of the tool is desired, occurs by virtue of lifting of the cone member 75 out from under the slips 73 as the string and sub body are elevated.

Referring to FIGS. 2, 2a and 2b, the arrows 85 indicate the upward flow of the first stream of production fluid in by-passing relation around the expanded packer 24. On the other hand, the arrows 86 show the upward flow of the second stream of production fluid around the upper valve member or plug 44. FIGS. 3, 3a and 3b show the valve members elevated to cut off the flow of the production streams 85 and 86. It is also clear from these figures that the valve members and their interconnecting mandrel parts 48 and 50, as well as the collet ring 69, have sufficiently reduced diameter in relation to the bore 87 of the string as to be upwardly retrievable therethrough. For this purpose, a retrieving tool may be lowered downardly through the stream to retract the spring fingers inwardly toward the axis of the sub body, as by engagement with the serrated member extensions 88 of the spring fingers 66. Such retraction withdraws the latches 65 from the grooving 68 to allow such upward retrieval. A suitable seal is shown at 89 for sealing off between the mandrel part 48 and the bore 90 of the body section 17a.

Referring now to FIGS. 4, 4a and 4b, the tubing string 100 within the casing 101 has connected in series therewith a tubular sub 102 made up of sections 102a, 102b and 102c corresponding generally to the sub body sections 17a–17c discussed above. Vertically movable structure within the tubular body 102 includes a first valve member as described above, and bearing the same numbers, to control the first stream of production fluid in by-passing relation around the packer 24. The second valve member to control the second stream of production fluid flow differs in that it is responsive to a change in downward pressure transmission by control fluid in the string, such fluid being generally speaking out of communication with the first and second production fluid streams at the valving location. In this regard, the tubular body section 102a, which may be considered as part of the string, has a side port 103 to pass the second stream of production fluid to the exterior of the body or string, as represented by the arrow 104 in FIG. 4. The flow passes into an outer string tubular section 105, also shown in FIG. 5, and having such sealing relation with the first stream that the second stream of well production fluid flowing into the outer string passage 106 is confined for upward flow therein out of communication with the annulus 107 at the upper side of the packer, the latter annulus containing the first upward flowing stream of production fluid. A sealing relation of the second tubular string 105 with the first string body 102 may be established, for example, at the location 108.

The housing or body 102 is plugged by the structure generally indicated at 109, and which includes the upper valve member 110 in the form of a plug suspended by the stem 111 and the carrier 112 to which a carrier mandrel 113 is threaded at 114. The valve plug 110 is thread connected at 115 to a tubular mandrel part 116 which is in turn threaded at 117 in connecting relation to the sleeve member 36 of the lower valve, as described above. Part 116 contains a port 118 to pass the second stream flow of production fluid outwardly as indicated by the arrow 119, for continued upward flow within the passage 120 formed between the upper valve structure and the sub body section 102a, in order that such flow may subsequently pass through the side port 103.

The carrier mandrel 113 has a head 121 which is engageable by an internal flange 122 carried by a collet 123 to limit vertical travel of the valving structure relative to the collet. Thus, the collet supports a valve structure for telescopic moement relative thereto with the carrier mandrel 113 moving vertically through the bore 124 of the flange 122. The collet has fingers 125 bearing lugs 126 receivable in grooving 127, all of which parts correspond to the parts described above in connection with FIGS. 1–3, the principal difference in operation being that in FIG. 4 the valving structure is telescopically movable relative to the collet. Suitable seals are shown at 128, 129 and 130 for sealing off the valving structure with the sub body bores 132, 133 and 134. Body bore 133 acts as a seat for the seal 129 on the upper valve member plug 110 in order to seal off the second stream flow when the valving structure is in its upper position, not shown.

In operation, the valving structure may be kept in the illustrated down position, to pass the first and second streams of production fluid, as by operating the pump 62 in FIG. 5 to exert pressure on the control fluid within the string and acting downwardly against the upper valve member surfaces 135 and 136, thereby overcoming any upward force exertion by second stream production fluid against lower surface 137 of plug 110. In this regard, plug surface 138 and carrier surface 139 are of equal endwise oppositely facing area to cancel production fluid pressure exertion thereagainst. When upward displacement of the valving structure is desired, the pump 62 may be shut off to allow the upward flow of the second string of production fluid to exert pressure against surface 137 sufficient to overcome downward exertion of control fluid pressure in the string and above the plugging location 109. Upward flow of the second stream from within the outer string 105 may be taken from the line 140, seen in FIG. 5. The valve 141 in said line may be operated to reduce or increase such flow in order to vary the upward force transmission against valving surface 137 for further control of the valving condition.

Referring now to FIGS. 8, 8a and 8b, the tubing string 200 within the casing 201 has connected in series therewith a tubular sub 202 made up of sections 202a and 202b. Vertically movable structure 203 within the body is adapted to alter the upward flow of a stream of production fluid between well zones 204 and 205 at lower end upper sides of the packer 206 and outside the string, when the packer is set in the casing 207. Sub or body 202 has lower and upper side porting indicated at 208 and 209 to by-pass the stream of production fluid between zones 204 and 205, around the packer, and via the body interior as for example annular passage 210. The latter is formed between the bore 211 of the body section 202a and the periphery of the spool valve member 212 received within body 202 and forming a part of the vertically movable structure 203.

Member 212 may be characterized as carried for movement between a down position, as illustrated, in which well production flows through the ports 208 and 209 via passage 210 as indicated by arrows 213, and an up position (not shown) in which said flow is blocked by the cylindrical closure 214 forming a part of the member 212 and structure 203. Seals are seen at 215 and 216 to seal off between member 212 and bore 211. Also, side seal 217 seals off between member 212 and enlarged bore 218 of body 202.

It will be seen that structure 203 remains in plugging relation with the body 202 in string 201, and it also has downwardly facing surface area 219 to receive application of pressure exerted upwardly by the production fluid stream, and certain upwardly facing surface area 220 and 220a to receive application of string interior control fluid pressure exerted downwardly. In addition, structure 203 has other upwardly facing surface area 221 to receive pressure exerted downwardly by said production fluid stream, surface area 219 being greater than surface area 221 in order that application of production fluid pressure may yield a net upward force transmission to the structure 203. Such net upward force is then controllably opposed by the downward force application of the string interior control fluid on surface area 220 and 220a, as indicated by arrows 222 and 222a. As a result, the structure 203 may be displaced up or down in response to variably controlling the pressure application of the column of control fluid in the string interior above the structure 203. Also, both surfaces 219 and 221 remain exposed to the pressure of production fluid in zone 205 above the packer when the structure is in the up position shutting off said production fluid flow, to hold structure 203 in said up position.

An interior shoulder 224 on body section 202a limits downward movement of structure 203, whereas upward travel thereof is limited by shoulder 225 on the collet ring 226 carrying structure 203. In this regard, structure 203 may be considered to have telescopic connection to collet ring 226 via the shaft 227 which slides vertically in the collet ring bore 228. A shear pin 229 connects the shaft and collet ring in the valve member open position, as shown, for lowering the unit in a fluid filled well. Thereafter, the pin is sheared when production fluid velocity created pressure is sufficient to effect upward movement of structure 203 relative to the collet ring and body 202.

As before, the collet means 230, of which ring 226 is a part, has spring fingers 231 with latches 232 releasably receivable in sub body bore grooving 233, and the structure 203 is sized for upward retrieval from the body upon inward retraction or release of latches 232 from the grooving. Also, the assembly includes slips 234, and slip actuator 235 responsive to pressure of well fluid in the string interior 236 communicated to the actuator via port 237. Wedge surfaces for the slips are seen at 238. Packer actuator 240 is seen to have a flow port 241.

I claim:

1. In combination, a tubing string in a well, apparatus packing off between the string and a bore in the well, and means for altering the upward flow of a first stream of production fluid between well zones at upper and lower sides of the packer and outside the string and also to decrease the upward flow of a second stream of production fluid in the string all in response to a change in pressure transmission by fluid within the string, said means including interconnected valve and piston structure movable vertically within the string and having a first surface to receive application of fluid pressure exerted upwardly by production fluid and a second surface exposed to receive application of control fluid pressure confined within and exerted downwardly solely via the interior of the string.

2. In combination, a tubing string in a well, apparatus packing off between the string and a bore in the well, and vertically movable structure including a first valve member for altering the upward flow of a first stream of production fluid between well zones at upper and lower sides of the packer and outside the string and a second valve member for controlling the flow of a second stream of production fluid in the string all in response to a change in pressure transmitted to said structure by fluid acting within the string, said structure having a piston surface exposed to receive application of control fluid pressure confined within and exerted downwardly solely via the interior of the string.

3. The combination of claim 2 in which the second valve member presents a downwardly facing surface to receive pressure exerted upwardly by second stream fluid, said structure having a down position in which said first and second streams are free to flow upwardly past said first and second valve members respectively, and an up position in which said valve members restrict upward flow of said respective production fluid streams.

4. The combination of claim 3 in which said structure is of sufficiently reduced diameter in relation to said string as to be upwardly retrievable therethrough.

5. The combination of claim 3 in which said structure is connected in the string to remain in plugging relation therewith, the string having a side port to pass said second stream of production fluid to the exterior thereof at the upward discharge side of said second valve member.

6. The combination of claim 3 in which said structure is connected in the string to cause said second valve member to plug the string in said up position and to unplug the string in said down position.

7. The combination of claim 5 including means at the well surface for altering said control fluid pressure.

8. An assembly connectible in series with a string of tubing in a well containing a packer to pack off the annulus between the string and a well bore, said assembly including a tubular sub body, and structure carried for vertical movement in said body and including a first valve member for altering the upward flow of a first stream of production fluid between well zones at upper and lower sides of the packer and outside the body and a second valve member for controlling the flow of a second stream of production fluid in the body all in response to a change in pressure transmitted to said structure by fluid acting within the body, said structure having a piston surface exposed to receive application of control fluid pressure confined within and exerted downwardly solely via the interior of said string and body.

9. The combination of claim 8 in which the second valve member presents a downwardly facing surface to receive pressure exerted upwardly by second stream fluid, said structure having a down position in which said first and second streams are free to flow upwardly past said first and second valve members respectively, and an up position in which said valve members restrict upward flow of said respective production fluid streams.

10. The combination of claim 7 in which said structure is of sufficiently reduced diameter in relation to said body as to be upwardly retrievable therefrom, the assembly including means releasably latching said structure in said body.

11. The combination of claim 8 in which said structure is connected to said body to remain in plugging relation therewith, the body having a side port to pass said second stream of production fluid to the exterior thereof at the upward discharge side of said second valve member.

12. The combination of claim 8 in which said structure is connected in the body to cause said second valve member to plug said body in said up position and to unplug said string in said down position.

13. The combination of claim 8 in which said body has upper and lower side ports to pass said first stream of production fluid, and said second valve member is tubular and forms a passage with said body to pass said first stream between said ports, said first valve member having a closure movable to close and open one of said ports.

14. The combination of claim 8 in which the packer is carried by said body, and including means operable to effect body supported connection to the well bore and expansion of the packer into sealing engagement therewith, said last named means including slips outwardly spreadable below the packer and fluid responsive actuator mechanism exposable to fluid pressure within the body and movable upwardly to effect spreading of the slips and expansion of the packer when fluid pressure within the body is sufficiently increased, said slips and actuator mechanism being carried by said body.

15. In the method of controlling production fluid flow in a well into which a string of production tubing is run, the annulus between the string and a well bore being packed off, the steps that include flowing production fluid between well zones at upper and lower sides of the packer and outside the string, transmitting control fluid pressure downwardly in the well via the interior of the production tubing while blocking access of control fluid to the exterior of the production tubing string, and effecting a change in said production fluid flow by changing said control fluid pressure.

16. In the method of controlling production fluid flow in a well into which a string of production tubing is run, the annulus between the string and a well bore being packed off, the steps that include flowing a first stream of production fluid between well zones at upper and lower sides of the packer and outside the string, flowing a second stream of production fluid vertically in the string, and simultaneously changing flow of said streams by changing the pressure of control fluid transmitted downwardly in the well solely within the string.

17. The method of claim 16 in which the last step is carried out by changing the pressure transmitted downwardly in the string by control fluid out of communication with said second stream.

18. The method of claim 16 in which the last step is carried out by changing the upward flow rate of said second stream of fluid.

19. In the method of controlling a cased well into which a string of production tubing is run, the string supporting slip, packer and valve assemblies characterized as operable respectively to anchor the string to the casing, to pack off between the string and casing and to control vertical by-passing around the packer of fluid in the annular space between the string and casing, the valve assembly also being characterized as fluid pressure operable, the steps that include running said string supported assemblies into the well, operating the slip and packer assemblies to anchor the string to the casing and to pack off between the string and casing, and then operating said valve assembly to alter said by-passing communication around the packer, said valve operation being carried out by transmitting control fluid pressure downwardly in the well via the interior of the production tubing while blocking access of control fluid to the exterior of the production tubing string.

20. The method of claim 19 in which said valve operating step is carried out by controlling the pressure transmitted downwardly by fluid in the string.

21. The method of claim 19 in which said valve operating step is carried out by controlling the pressure transmitted by fluid flowing upwardly in the string.

22. In combination, a production tubing string in a well, apparatus packing off between the string and a bore in the well, and structure movable vertically but retained within the string for altering the upward flow of a stream of production fluid between well zones at lower and upper sides of the packing apparatus and outside the string, said structure having downwardly facing surface area to receive application of pressure exerted upwardly by production fluid, said structure remaining in vertically obstructing relation with the string interior and having certain upwardly facing surface area to receive application of string interior control fluid pressure exerted downwardly, said upwardly facing surface area remaining out of communication with the exterior of the production tubing string through the side thereof in all positions of said structure, said string including a tubular sub body containing said structure and having side ports generally above and below said packing apparatus, said structure having a down position in which well production fluid flows through the lower side port into said body and then upwardly therein to exit therefrom via the upper side port, and said structure having an up position in which said flow is blocked by said structure.

23. The combination of claim 22 including means releasably connecting said structure to said body and relative to which said structure is telescopically movable, said structure being sized for upward retrieval from said body upon release of said means from connection to said body.

24. The combination of claim 22 in which said structure also has other upwardly facing surface area to receive pressure exerted downwardly by said production fluid stream, said downwardly facing surface area being greater than said other upwardly facing surface area and both being exposed to production fluid in the well zone at the upper side of the packing apparatus and outside the string when said structure is in said up position.

25. In combination, a tubing string in a well, apparatus packing off between the string and a bore in the well, and vertically movable structure including a first valve member for altering the upward flow of a first stream of production fluid between well zones at upper and lower sides of the packer and outside the string and a second valve member for controlling the flow of a second stream of production fluid in the string all in response to a change in pressure transmitted to said structure by fluid acting within the string, the second valve member presenting a downwardly facing surface to receive pressure exerted upwardly by second stream fluid, said structure having a down position in which said first and second streams are free to flow upwardly past said first and second valve members respectively, and an up position in which said valve members restrict upward flow of said respective production fluid streams, and including a second tubular string in the well in series communication with the upward discharge side of said second valve member to receive said second stream of production fluid.

26. In combination, a tubing string in a well, apparatus packing off between the string and a bore in the well, and vertically movable structure including a first valve member for altering the upward flow of a first stream of production fluid between well zones at upper and lower sides of the packer and outside the string and a second valve member for controlling the flow of a second stream of production fluid in the string all in response to a change in pressure transmitted to said structure by fluid acting within the string, the second valve member presenting a downwardly facing surface to receive pressure exerted upwardly by second stream fluid, said structure having a down position in which said first and second streams are free to flow upwardly past said first and second valve members respectively, and an up position in which said valve members restrict upward flow of said respective production fluid streams, the string including a sub body containing said structure, and means operable to effect body supported connection to the well bore and expansion of the packer apparatus into sealing engagement therewith, said last named means including slips outwardly spreadable below the packer and fluid pressure responsive actuator mechanism exposable to fluid pressure within the sub body and movable upwardly to effect spreading of the slips and expansion of the packer when upward flow of said second stream of well fluid is sufficiently restricted by said second valve member.

27. An assembly connectible in series with a string of tubing in a well containing a packer to pack off the annulus between the string and a well bore, said assembly including a tubular sub body, and structure carried for vertical movement in said body and including a first valve member for altering the upward flow of a first stream of production fluid between well zones at upper and lower sides of the packer and outside the body and a second valve member for controlling the flow of a second stream of production fluid in the body all in response to a change in pressure transmitted to said structure by fluid acting within the body, the assembly including an outer tubular part enclosing a portion of said body and adapted for connection with another tubular string in the well, said part having fluid receiving communication with the upper discharge side of the second valve member to receive the second stream of production fluid.

28. In combination, a main string in a well including a tubular sub body and tubing connected coaxially with opposite end portions of said body, apparatus packing off between the string and a bore in the well, the body having upper and lower side porting to communicate between well zones at upper and lower sides of the packer apparatus, and means for altering communication between said well zones at lower and upper sides of the packer apparatus and outside the string in response to a change in pressure transmission by fluid within the string, said means including interconnected valve and piston structure movable vertically within said body to control fluid stream flow through said porting, said structure having a piston surface exposed to receive application of control fluid pressure confined within the interior of said main string tubing above said body and exerted downwardly solely via said main string, said surface remaining out of direct communication with the well zone at the upper side of the packer.

29. In combination, a main string in a well including a tubular sub body and tubing connected coaxially with opposite end portions of said body, said tubing having spaced concentric portions extending about said body, apparatus packing off between the string and a bore in the well, and means for altering communication between well zones at lower and upper sides of the packer apparatus and outside the string in response to a change in pressure transmission by fluid within the string, said means including valve and piston structure movable vertically within said body, said structure having a piston surface exposed to the interior of one of said spaced concentric portions of the tubing to receive application of control fluid pressure confined within and extended downwardly solely via said interior, said surface remaining out of direct communication with the well zone at the upper side of the packer, the interior of the other of said spaced concentric portions of the tubing being communicable with main string tubing extending below the sub body via the lower interior of said body.

30. An assembly connectible in series with a main string of tubing in a well containing a packer to pack off the annulus between the string and a well bore, the assembly including a tubular sub body having opposite end portions connectible coaxially with the tubing, the body having upper and lower side porting to communicate between annulus zones at upper and lower sides of the packer, and means for altering communication between well zones at lower and upper sides of the packer apparatus and outside the body in response to a change in pressure transmission by fluid within the body, said means including interconnected valve and piston structure movable vertically within said body to control fluid stream flow through said porting, said structure having a piston surface exposed to receive application of control fluid pressure confined within the interior of said main string tubing above said body and exerted downwardly solely via said main string, said body side wall blocking direct communication of said surface with the exterior of the body in all positions of said structure.

References Cited by the Examiner
UNITED STATES PATENTS

| | | | |
|---|---|---|---|
| 2,894,588 | 7/1959 | Tausch et al. | 166—149 |
| 2,963,089 | 12/1960 | Sizer | 166—224 |
| 3,050,132 | 8/1962 | Page | 166—224 |
| 3,065,794 | 11/1962 | Page | 166—224 |
| 3,156,300 | 11/1964 | Page et al. | 166—224 |
| 3,236,255 | 2/1966 | Size | 166—224 |

ERNEST R. PURSER, *Primary Examiner.*

JACOB L. NACKENOFF, CHARLES E. O'CONNELL, JAMES A. LEPPINK, *Examiners.*